United States Patent [19]

Nagayoshi et al.

[11] Patent Number: 5,039,266
[45] Date of Patent: Aug. 13, 1991

[54] DIVIDED NUT

[75] Inventors: Akio Nagayoshi; Kiyoharu Nagayoshi, both of Sakai, Japan

[73] Assignee: Yu Shi Sangyo Kabushiki Kaisha, Osaka, Japan

[21] Appl. No.: 519,239

[22] Filed: May 4, 1990

[51] Int. Cl.[5] .............................................. F16B 37/08
[52] U.S. Cl. ..................................... 411/433; 411/539
[58] Field of Search ............... 411/432, 433, 437, 539, 411/265, 266, 540

[56] References Cited

U.S. PATENT DOCUMENTS

| 647,928 | 4/1900 | Adams | 411/539 |
|---|---|---|---|
| 1,452,492 | 4/1923 | Carpenter | 411/539 |
| 4,132,146 | 1/1979 | Uhlig | 411/433 |
| 4,556,352 | 12/1985 | Resnicow | 411/433 |
| 4,784,412 | 11/1988 | Van Dongen | 411/433 |

FOREIGN PATENT DOCUMENTS

| 558224 | 3/1960 | Belgium | 411/433 |
|---|---|---|---|
| 2546831 | 4/1977 | Fed. Rep. of Germany | 411/433 |

Primary Examiner—Neill R. Wilson
Attorney, Agent, or Firm—Edwin E. Greigg; Ronald E. Greigg

[57] ABSTRACT

A divided nut comprising two divided nut parts made of plastics which provide engaging projection means and engaging step means so as to engage with each other in a state of fixed fittings. The divided nut parts are integrally connected to each other by means of belt-like connecting means where they are bent to fit each other.

6 Claims, 8 Drawing Sheets

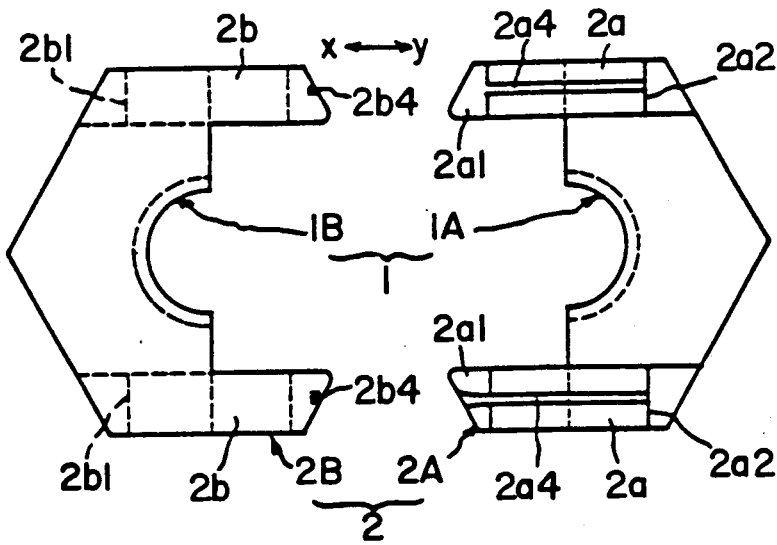
FIG. 1A
FIG. 1B
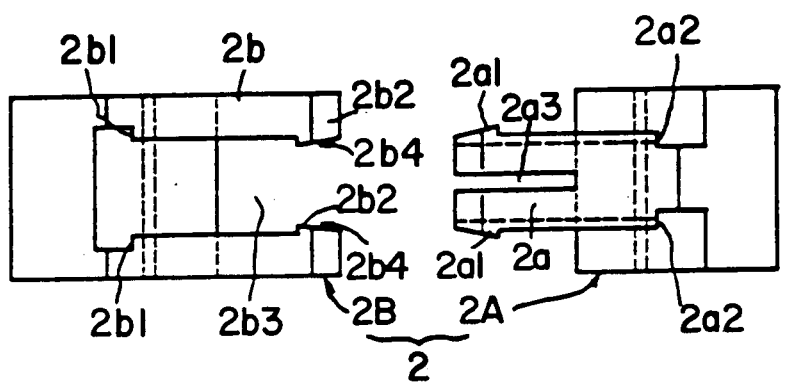
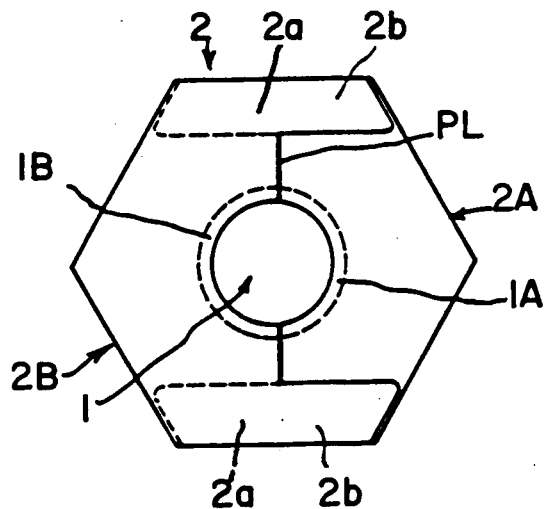
FIG. 2A
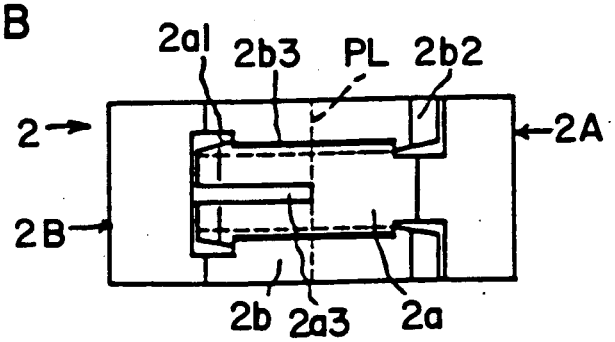
FIG. 2B

DIVIDED NUT

BACKGROUND OF THE INVENTION

1. Field of the Invention

This invention relates to a divided nut made of plastics which may screw on a bolt or a screw bar indivisibly.

2. Description of the Prior Art

Divided nuts of several types, which comprise a pair of divided nut parts, have been developed. As a means of screwing the divided nut on a bolt or a screw bar in such a state that the divided nut parts are connected to each other, the followings are well known. For instance, Japanese Utility Model Publication No. 50-37489 discloses that the divided nut keeps its screw fittings onto a bolt or a screw bar by holding the outer peripheries of the divided nut parts by means of a cover in such a state that the opposite surfaces of both of the divided nut parts are connected to each other. Further, British Patent No. 855,037 discloses a divided nut. Divided nut parts of the divided nut are hinged rotatably at a side portion of each of the parts. Another side of each of the parts, which sides are facing each other, provides a connectable projection having a hole. A pin is inserted into the holes of both of the projections so as to comprise an ordinary nut.

However, the divided nut of the former prior art becomes expensive as it necessitates a cover. Further, it is complex and takes time in fitting of the cover onto the divided nut while connecting the divided nut parts to each other and keeping them in its screwed position on a bolt or the like. Moreover, such a divided nut needs a means for fixing the cover so that the cover may not come off the divided nut. Further, it has a disadvantage that such a divided nut cannot be used for a screw bar which is already installed. Namely, in the case of a screw bar both ends of which are fixed to a wall or the like, both of the divided nut parts of the divided nut may be positioned on the screw bar to sandwich the screw bar from the sides thererof. However, a cover for holding the divided nut parts cannot be placed in its own position unless it is inserted to and positioned on the screw bar before fixing of the screw bar to the wall.

According to the divided nut of the latter prior art, the above mentioned disadvantages in the former prior art may be solved almost. However, when the hinge of the divided nut parts is shifted slightly in a direction of an axis of the hinge or in a direction of twist, the divided nut cannot be fit onto a bolt or a screw bar and its connection does not go in good order. Further, the divided nut is so constructed as to be able to assemble the divided nut parts by inserting the pin into the holes of the connectable projections provided with the opposite faces of another other side of each of the divided nut parts. Therefore, when a clearance is formed slightly between the pin and the holes, it cannot obtain a good screw connection as play occurrs therebetween. Further, when the pin is lost, the divided nut cannot work.

Since both kinds of the divided nuts as mentioned above, are screwed detachably onto a bolt or a screw bar, they may easily come off the bolt due to vibration or other external forces.

SUMMARY OF THE INVENTION

In order to solve the above-mentioned problems, the present invention has an object to provide a divided nut made of plastics which may be attached to a screw bar, one or both ends of which are already installed in a wall or the like, in a state of fixed fittings by a simple fitting operation.

To achieve the above mentioned object, according to the present invention the divided nut comprises two divided nut parts of plastics divided along a direction of an axis of the screw hole of the divided nut and connected to each other with a side of each thereof facing to each other, fitting projection means projected from the facing side of one of the divided screw parts, an engaging pawl provided with a tip of the fitting projection means, a groove formed with the opposite side of the other divided screw part to receive the fitting projection means of one of the divided screw parts and an engaging step formed with the facing side of the other divided nut part to engage the engaging pawl of one of the divided nut part in a state of fixed fittings.

According to the divided nut as mentioned above, where it is attached to a stud bolt both ends of which are installed in and fixed to a wall or the like, the divided nut parts are faced to each other at a desired position on the stud bolt by interposing the stud bolt and they are pressed in a direction of approching them to each other while the fitting projection means of one of the divided nut part is inserted into the groove of the other divided nut part. Then, the opposite sides of both of the divided nut parts are contacted to each other. When the divided nut parts are screwed completely onto the stud bolt, the engaging pawl of the fitting projection means flexibly engages with the engaging step formed with the other divided nut part and then the divided nut parts are united to be detachable and present an appearance of and function like an ordinary nut.

Namely, the divided nut parts are united to a nut only by inserting the fitting projection means of the divided nut part into the groove of the other divided nut part so as to connect and fix them to each other. Therefore, it is not necessary to use connecting means such as a cover, a conneciton pin or the like, which are used for the conventional divided nut. This means that connecting operation of the divided nut parts may be easily carried out. Further, since the divided nut parts may be screwed onto a bolt or a screw bar at a desired position with their screw holes in a shape of a semicircle, the state of screwing may be continued so that a smooth screw operation becomes possible on the bolt in forward and rearward directions.

Further, in the case of a screw bar both ends of which are fixed to a wall or the like, a pair of the divided nut parts may be positioned on the sides of the screw bar so as to sandwich the screw bar and then connected to each other. Since the engaging pawl of the fitting projection means engages with the engaging step of the groove of the other divided nut part and becomes in a state of fixed fittings and detachable, they do not come off the screw bar, thereby any parts attached to the screw bar may be fixed firmly.

Moreover, when the divided nut parts are connected to each other, the fitting projection means of one of the divided nut parts is fitted into the groove of the other divided nut part and therefore the appearance of the divided nut parts presents the same as that of an ordinary nut. This means that it becomes possible to rotate and tighten the divided nut smoothly by engaging a wrench with the outer periphery of the divided nut.

Another object of the present invention is to provide a divided nut made of plastic which is easy in handling and attaching onto a bolt or a screw bar.

In order to achieve the object, the divided nut according to the present invention further comprises bendable belt-like connecting means which integrally connect a side of a divided nut part of the divided nut and a side of another divided nut part, both of the sides of the divided nut parts being faced to each other. Since the divided nut parts are united by the bendable belt-like connecting means and not separated to one another, it may prevent one of the divided nut parts from loosing. Further, when handling the divided nut parts or attaching them onto a bolt, they may be handled easily as a single body.

Other objects and advantages of the present invention may be apparent from the description of the embodiments with reference to the drawings.

BRIEF DESCRIPTION OF THE DRAWINGS

The Drawings show embodiments of a divided nut according to the present invention in which:

FIGS. 1A and 1B are a plan view and a side view of a pair of divided nut parts,

FIGS. 2A and 2B are a plan view and a side view of the divided nut parts in a state of connection.

DETAILED DESCRIPTION OF THE EMBODIMENTS

Figure 3:
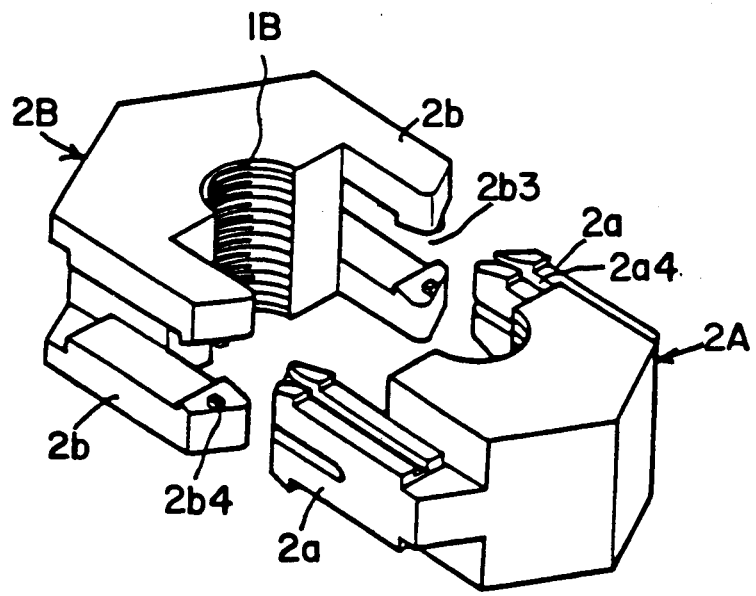
FIG. 3 is a perspective view of the divided nut parts.

A divided nut 2 is made of plastics such as hard synthetic resin and formed to have an appearance of a hexagon and a screw hole 1 is provided at a center portion thereof. The divided nut is divided into two divided nut parts 2A and 2B along an axis of the scew hole 1.

Each of the divided nut parts 2A and 2B, therefore, provides a screw hole portion 1A or 1B of semicircle respectively at the center portion of a connecting side thereof which is facing to each other when they are connected to each other. A fitting projection 2a of a convex is made to project respectively from both sides of the connecting side of one of the divided nut part 2A toward the other divided nut part 2B. An engaging pawl 2a1 is formed respectively with both of the outer sides of a tip of the fitting projection 2a to have an inclined side which is gradually raised rearwardly. An engaging step 2a2 is formed respectively with both of the outer sides at the base of the engaging projection 2a.

The other divided nut part 2B provides a pair of projections 2b of concave respectively on both of the side portions of the connecting side thereof in such a manner that the fitting projections 2a project toward another divided nut part 2A, leaving, in a direction of an axis of the screw hole 1B, a space substantially equal to a width of the fitting projection 2a. The space between the projections 2b and 2b, which are facing to each other, is formed to be a guide groove 2b3 for the fitting projection 2a. Engaging steps 2b1 and 2b1 are formed with the bottom of the projections 2b and 2b so as to engage with the engaging pawls 2a1 and 2a1. Further, engaging pawls 2b2 and 2b2 are formed with the facing sides of a tip of the projections 2b and 2b so as to engage with the engaging steps 2a2 and 2a2 of the fitting projection 2a.

The numeral 2a3 indicates a slit formed by cutting from a center portion of a tip of the fitting projection 2a to the engaging surface. The slit 2a3 gives a spring effect to the fitting projection 2a so as to allow an elastic deformation in a direction of a width thereof.

A slit groove 2a4 is cut straight on both of the outer sides of the fitting projection 2a straight in a longitudinal direction of the fitting projection 2a and on the other hand a small projection 2b4 is made to project from the inside of a tip of the projection 2b so as to engage with the slit groove 2a4 in order to carry out a connection easily and precisely between the divided nut parts 2A and 2B.

However, where a guide groove is formed with both of the sides of the divided nut part 2B to receive the fitting projection 2a of another divided nut part 2A without providing the projections 2b and 2b with the other divided nut part 2B, it is not necessary to provide such slit groove 2a4 and small projection 2b4. Besides, the engaging steps 2a2 and 2a2 and the engaging pawls 2b2 and 2b2 are not necessary only by forming the engaging steps 2b1 and 2b1 with the bottom of the guide groove.

The divided nut constructed as above is handled as the two divided nut parts 2A and 2B as shown in FIGS. 1A and 1B, before it is used.

Figure 10:
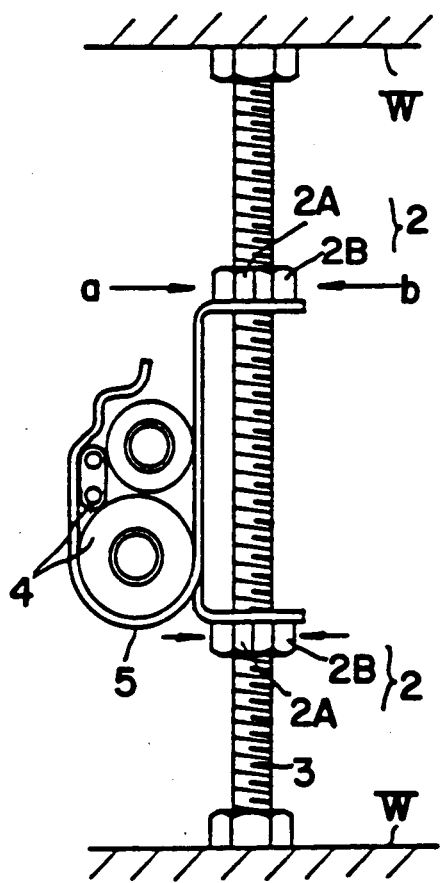
FIG. 10 is a side view showing a state of using the divided nut.
Figure 11:
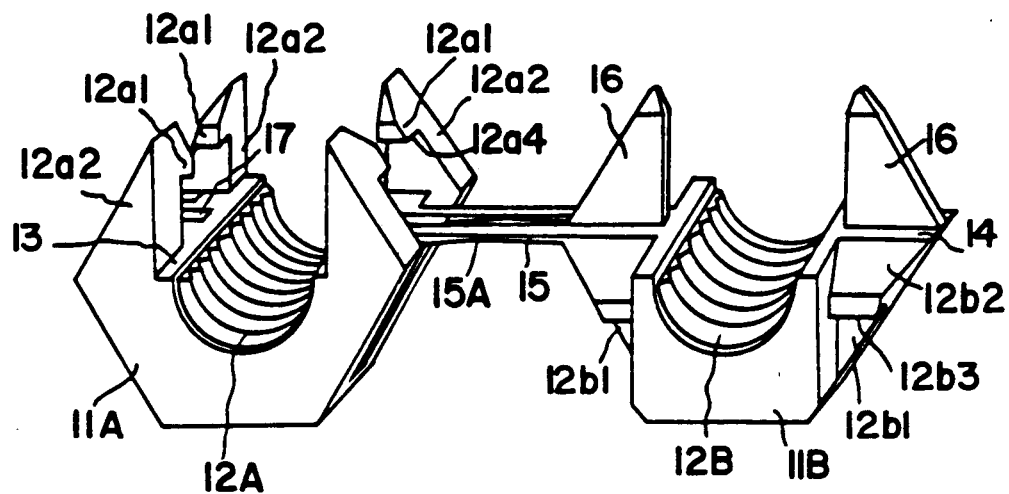
FIG. 11 is a perspective view of a divided nut of another embodiment according to the invention.
Figure 12:
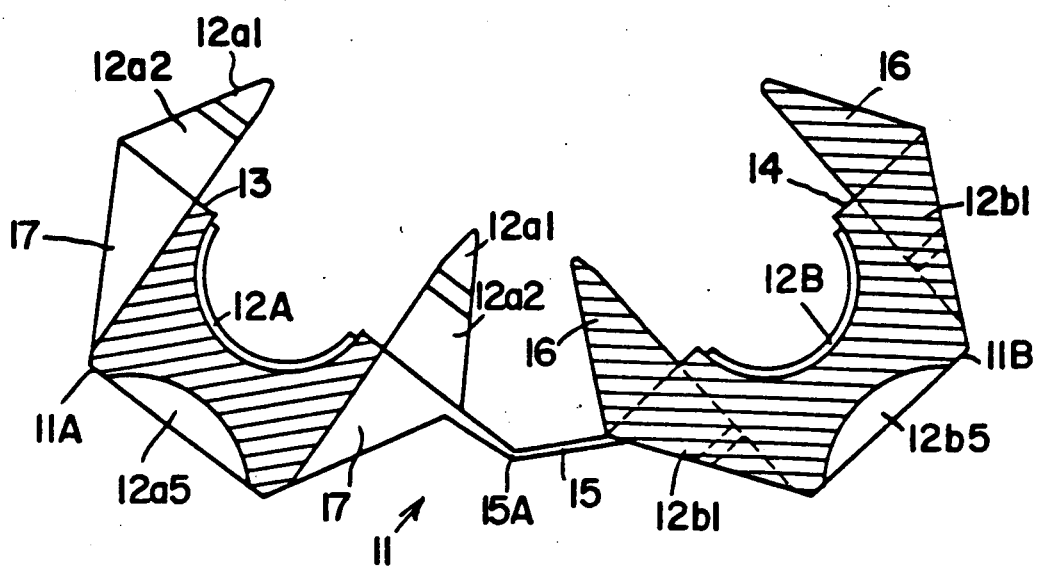
FIG. 12 is a sectional view taken at a center of the divided nut for showing bending state thereof.

For instance, as shown in FIG. 10, where a saddle holding a pipe 4 is attached or mounted onto a stud bolt 3 which is installed in and fixed to a wall W with its upper and lower ends, both of the divided nut parts 2A and 2B are positioned outwardly of the sides of the stud bolt 3 at a desired position of the saddle 5 on the stud bolt 3 and then these divided nut parts 2A and 2B are pressed in a direction to be close to each other so as to insert the fitting projections 2a and 2a of the divided nut part 2A into the guide groove 2b3 of the other divided nut part 2B. As the result, the engaging pawls 2a1 and 2a1 of the fitting projections 2a and 2a are forced to be in contact with the facing side of the guide groove 2b3 and the facing inside of the fitting projections 2a and 2a are slid in the guide goove 2b3, while contacting the wall of the guide groove, in such a state that with the function of the slit 2a3 the engaging pawls are elastically moved in a direction to approch each other. When the engaging pawls 2a1 and 2a1 of the fitting projections 2a and 2a reach the bottom of the guide groove 2b3, the engaging pawls 2a1 and 2a1 elastically engage with the engaging steps 2b1 and 2b1 of the guide groove 2b3 so that the facing sides of the divided nut parts 2A and 2B are integrally connected to each other. Thus, the circular screw hole 1 screwed on the stud bolt 3 may be formed with the semicircular screw holes 1A and 1B of the divided nut parts 2a and 2B.

Thereafter, the divided nut is rotated like an ordinary nut, and fixes and holds the saddle 5 on the stud bolt 3 at a desired position.

Figure 4:
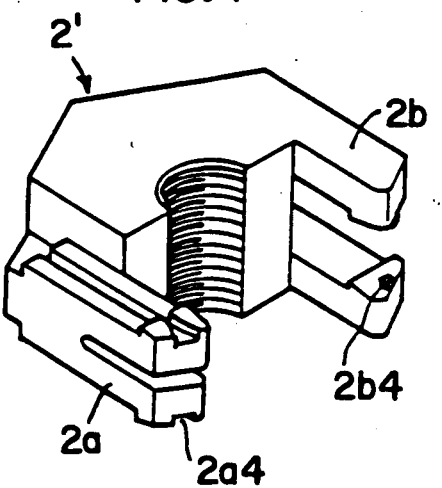
FIG. 4 is a perspective view of a divided nut part showing another embodiment of the present invention.

FIG. 4 shows another embodiment of the present invention. A fitting projection 2a is made to project from a center portion of a side of a divided nut part 2' and projections 2b of concave is also made to project from both of the sides on the other side of the divided nut part 2'. With this construction it is possible to comprise a divided nut by using two pieces of the divided nut part 2' of the same shape. Therefore, this embodiment only requires a set of dies for molding the divided nut parts with plastics and may reduce the molding cost.

Figure 5:
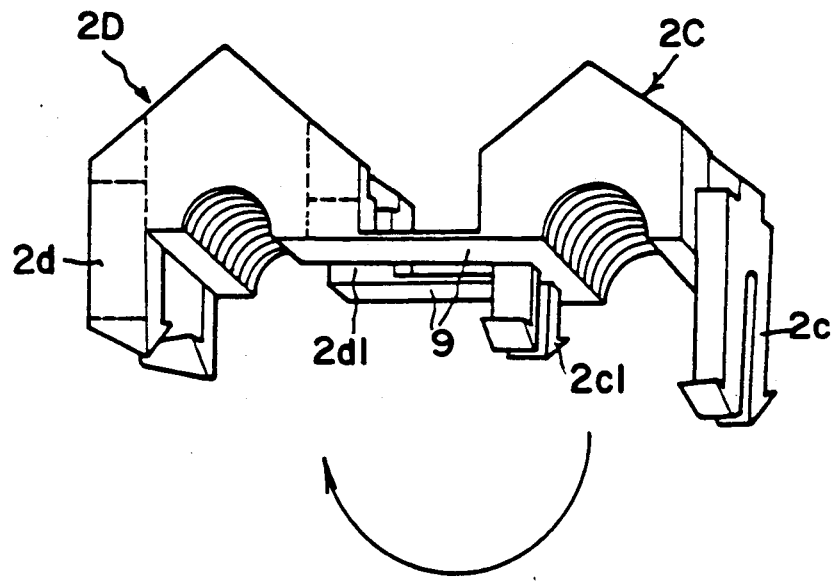
FIG. 5 is a perspective view of a divided nut showing a further embodiment of the present invention.
Figure 6:
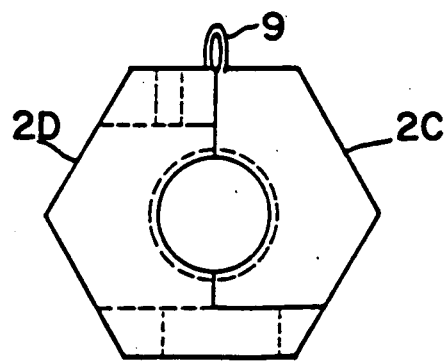
FIG. 6 is a plan view showing a state of connection of the divided nut in FIG. 5.

FIGS. 5 and 6 show a further embodiment of the present invention. A long fitting projection 2c of convex and a short fitting projection 2c1 of convex are provided to project from the center of both ends of the connecting side of the divided nut part 2C, said long and short fitting projections being provided with an engaging pawl respectively at the outer side of a tip thereof, are provided to project from the center portion of both of the side on a connecting side of a divided nut part 2C facing a connecting side of another divided nut part 2D. A groove 2d1 is formed with the connecting side of the other divided nut part 2D at a center of a side portion thereof so as to receive therein and engage with the short fitting projection 2c1. A projection 2d of concave is provided with both ends of the other side of the divided nut part 2D to receive therein and engage with teh long fitting projection 2c1. Further, these divided nut parts 2C and 2D are connected integrally at a side end of the connecting sides thereof by means of two bendable belt-like connectors 9 and 9.

Figure 7:
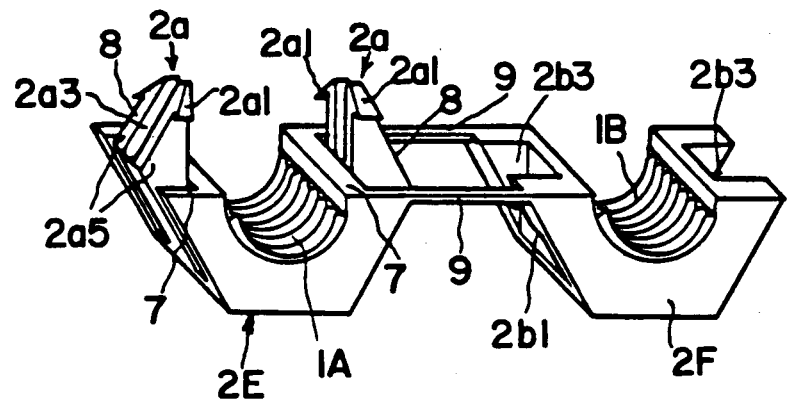
FIG. 7 is a perspective view showing a modified embodiment of the divided nut shown in FIG. 5.
Figure 8:
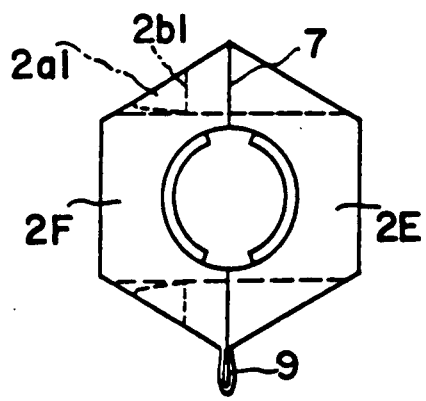
FIG. 8 is a plan view of the divided nut shown in FIG. 7.
Figure 9:
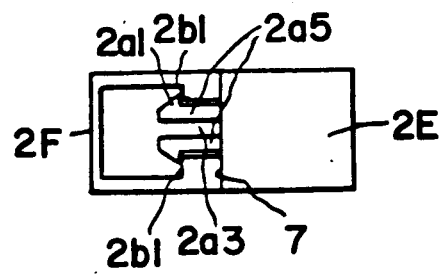
FIG. 9 is a side view of the divided nut shown in FIG. 7.

FIGS. 7 and 9 show a further embodiment of the present invention modifying the divided nut of hard synthetic resin as shown in FIGS. 5 and 6. A pair of divided nut parts 2E and 2E have a shape which is obtained by dividing a nut of hexagon in a direction of an axis of a screw hole 1 along a line that goes through the axis of the screw hole 1 and two corners of the hexagon which are opposed to each other. Engaging projections 2a and 2a are made to project perpendicular to both of sides 7 from the center portion of both of sides 7 and 7 of one divided nut part 2E, said engaging projections having the same height. An engaging pawl 2a1 having the same shape as the engaging pawl 2a1 of the above mentioned embodiment, is formed with the outer side of a tip of each of the fitting projections 2a and 2a respectively. A straight slit 2a3 is formed with the center portion of the engaging pawls 2a1 and 2a1 to extend from their surface of the tip to the connecting side so as to separate fitting projections 2a5 and 2a5 which are parallel to each other and elastically bendable in a direction to close the straight slit 2a3. The outer side of each of the fitting projections 2a and 2a is formed to be a taper side 8 which comprises a portion of a side of a nut in the shape of a hexagon.

Grooves 2b3 and 2b3 are formed with center portions of both sides of the other divided nut part 2F from its outer side to the screw hole 1B of semicircle. The sides of the groove 2b3 facing to each other, are formed to be parallel sides. A width of the groove is made to be larger than a width between the tips of the engaging pawls 2a1 and 2a1, and also made to be small slightly than a width between the bases of the engaging pawls. The bottom sides of the grooves 2b3 and 2b3 are formed to be perpendicular to the connecting side, i.e. to be parallel to each other. An engaging step 2b1 is formed by expanding or widening the deep portions of the grooves 2b3 and 2b3 outwardly so as to receive the engaging pawl 2a1 when the engaging nut parts 2E and 2F are completely connected to each other.

The divided nut parts 2E and 2F as constructed above, are integrally connected to each other at a side of each of the connecting sides thereof by means of bendable thin belt-like connectors 9 and 9. When the divided nut parts 2E and 2F are attached to a bolt or a screw bar, they are positioned to sandwich the bolt via the space between the sides of thereof which are not connected by the belt-like connectors 9 and 9, and then these divided nut parts 2E and 2F are pressed in a direction to be close to each other. As the result, the outer taper sides of the engaging pawls 2a1 and 2a1 of the fitting projections 2a and 2a contact and slide on the facing sides of the grooves 2b3 and the fitting projection 2a goes into the groove 2b3 while elastically deforming the engaging pawls 2a1 and 2a1 to be compressed. When the facing sides of the divided nut parts 2E and 2F are completely connected, the engaging pawl 2a1 elastically returns outwardly so as to engage with the engaging step 2b1 in a state of fixed fittings as an ordinary nut.

A further embodiment of the present invention will be described below with reference to FIGS. 11 through 16.

A divided nut 11 is made of hard synthetic resin and it is formed in a shape of hexagon. The divided nut 11 has a screw hole 12 at the center thereof and divided into two pieces of divided nut parts 11A and 11A in a direction of an axis thereof along a line passing two corners of the hexagon which are located symmetrically.

Therefore, the divided nut parts 11A and 11A provide semicircle screw portions 12A and 12B at the center of each of divided facing sides 13 and 14. A side edge of the divided side 13 of the divided nut parts 11a is connected to a side edge of divided side 14 of the divided nut parts 11B by means of two belt-like connectors 15 and 15. The belt-like connectors 15 and 15 are made of hard synthetic resin to be bendable and formed to be integral with the divided sides 13 and 14 by using the same material as that of the divided nut parts 11A and 11A, and these connectors are formed to be thin and have a narrow width. However, the belt-like connectors 15 and 15 may be constructed to a single body.

Figure 13A:
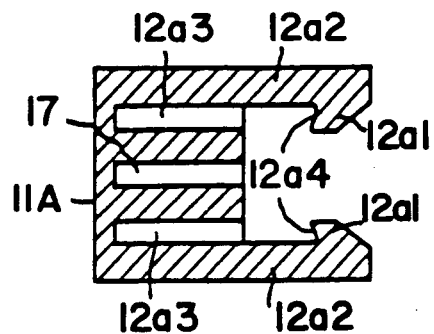
FIGS. 13A and 13B are side views of the divided nut.

As shown in FIG. 13A, a pair of holding projections 12a2 and 12a2 are provided with both ends of the outer side of the semicircle screw hole portion 12A formed on the divided side of the divided nut part 11A. The holding projections 12a2 and 12a2 are made to project in parallel to each other to be able to elastically deform in inward and outward directions and provide an engaging pawl 12a1 with the inside of a tip thereof, respectively. Also, the holding projections provide grooves 12a3 and 12a3 on the outer side of the divided nut part 11A. Inclined engaging sides 12a4 and 12a4 are formed with the engaging pawls 12a1 and 12a1 in such a manner that they are inclined rearwardly from the base of the engaging pawls to a tip thereof. A bending portion 15A, which is formed to be thin in thickness, is provided with the belt-like connector 15 at a shifted position adjacent the divided nut part 11A which provides the holding projection 12a and 12a.

Figure 13B:
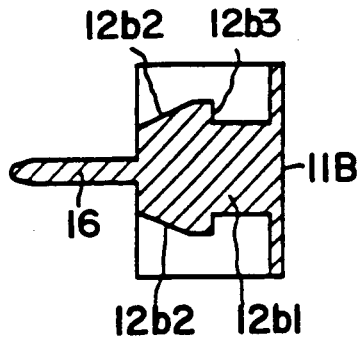

Further, as shown in FIG. 13B, an engaging projection 12b1, which is held between the holding projections 12a2 and 12a2, is formed with a center portion of the outer side of the semicircle screw hole portion 12B in such a state that it becomes slightly thick comparing with a space between the engaging pawls of the holding projections 12a2 and 12a2. Both sides of the engaging projection 12b1 is formed to be inclined sides 12b2 and 12b2 which increase its thickness gradually from a tip thereof to the inside or base thereof. At a center of each of the sides of the engaging projections 12b1 and 12b1, engaging steps 12b3 and 12b3 are formed to take a step perpendicularly so that they are fit between the engaging pawls 12a1 and 12a1 of the divided nut part 11A in a state of fixed fittings when the divided sides 13 and 14 of the divided nut parts 11A and 11B are contacted and connected to each other.

Figure 14:
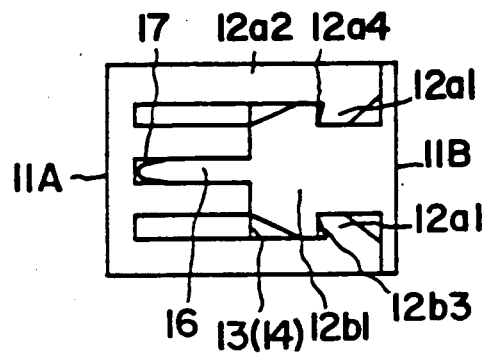
FIG. 14 is a side view showing a connecting state of divided nut parts thereof.
Figure 15:
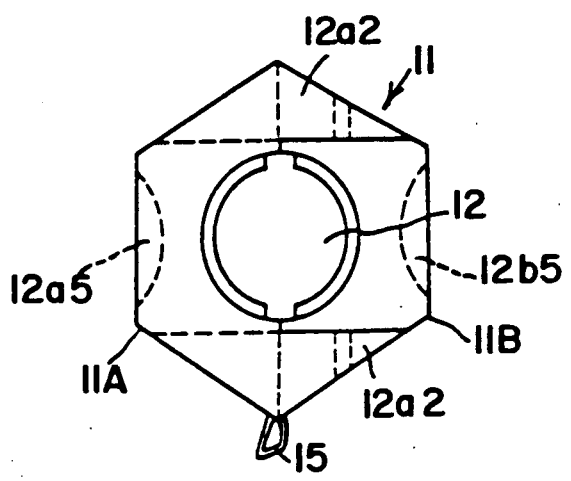
FIG. 15 is a plan view showing the connecting state.

Namely, as shown in FIG. 14, distances from the divided side 13 of the divided nut part 11A to engaging sides 12a4 and 12a4 of the engaging pawls 12b1 and 12b1, are designed to have the same sizes as distances from the divided side 14 of the other divided nut part 11B to the engaging steps 12b3 and 12b3, thereby the engaging steps 12b3 and 12b3 may be engaged with the engaging pawls 12a1 and 12a1 in a state of fixed fittings when the divided nut parts 11A and 11B are contacted and connected to each other.

The engaging steps 12b3 and 12b3 may be constructed to form an inclined step which may engage with the engaging sides 12a4 and 12a4 of the engaging pawls 12a1 and 12a1 in a state of face to face contact.

Further, a fitting projection 16 is provide with a center portion of each of the sides of the engaging projections 12b1 and 12b1, respectively. The fitting projection 16 is formed in a shape of a side of hexagon and becomes thin gradually towards a tip thereof. A fitting groove 17 is provided with a center portion of the divided side of the other divided nut part 11A in order to receive the fitting projection 16.

The outer periphery of each of the divided nut parts 11A and 11B provide finger hook portions 12a5 and 12b5 of concave respectively for easily pushing and connecting the divided nut parts with fingers. The outer side of each of the holding projections 12a2 and 12a 2 is formed to be an inclined side which comprises a part of the outer periphery of a nut of hexagon to range to the same plane as the outer side of the engaging projections 12b1 and 12b1 when the divided sides 13 and 14 of the divided nut parts 11a and 11B are contacted and connected to each other.

Figure 16:
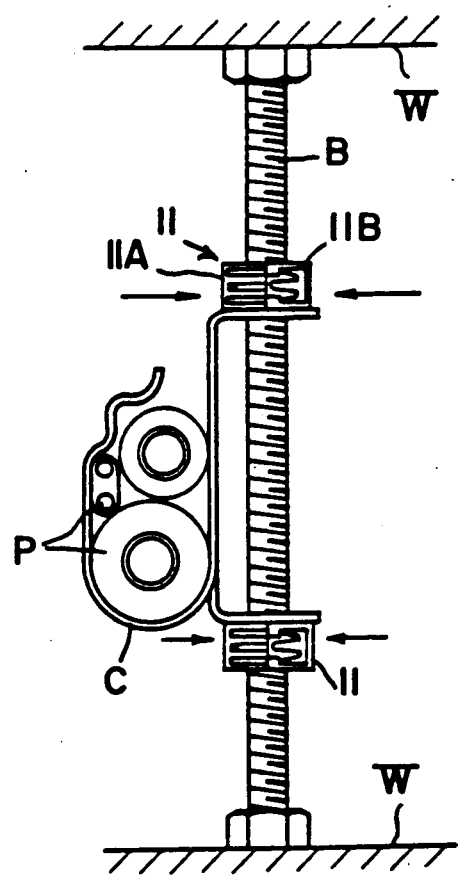
FIG. 16 is a side view showing usage of the divided nut.

The divided nut parts 11A and 11B are connected to each other in a state of fixed fittings by using substantially the same manner as mentioned in the first embodiment of this invention and each of the elements of the divided nut 11 may function as well in the case of the first embodiment so as to be screwed into a bolt B as shown in FIG. 16.

Besides, the belt-like connector 15 is formed to have a bendable thin portion at a position adjacent the divided nut part 11A which provides the holding projections 12a2 and 12a2 at the center thereof in its longitudinal direction. Therefore, the divided nut parts 11A and 11B may swing to close to each other about the bendable portion 15A. In the swing, the divided nut part 11A is swung or rotated while the divided side 13 of the divided nut part 11A is pulled slightly toward the connector 15 against the other divided nut part 11B. Accordingly, the tips of the holding projections 12a2 and 12a2 may be certainly inserted and fitted into both of the sides of the engaging projections 12b1 and 12b1 of the other divided nut part 11B without contacting the divided side of the divided nut part 11B. Further, when the divided nut 11 is screwed at a predetermined position on a bolt by means of a wrench or the like, tightening force may be dispersed via the sides of screw of the semicircle screw hole portions 12A and 12B and a part of the tightening force functions to widen or separate the divided nut parts 11A and 11B outwardly. However, such a tightening force also disperses and functions to press the holding projections 12a2 and 12a2 toward the engaging projections 12b1 and 12b1 in up and down directions. Therefore, the engagements of the engaging pawls 12a1 and 12a1 to the engaging steps 12b3 and 12b3 of the divided nut part 11A and 11B, cannot be released even if they are tightened by any strong forces.

Further, where the inclined engaging sides 12a4 is formed with each of the engaging pawls 12a1 and 12a1 to incline rearwardly from the base of the engaging pawl toward a tipe thereof, even if a force of separating the divided nut parts 11A and 11B outwardly becomes great, the tip portion of each of the engaging pawls 12a1 and 12a1 may slide in a direction of engaging inwardly along the engaging sides of the engaging steps 12b3 and 12b3, and as the result, the engaging projections 12b1 and 12b1 may engage with the engaging steps 12b3 and 12b3 deeply. Therefore, the engagement of the divided nut parts 11A and 11B cannot be released unless the engaging pawls 12a1 and 12a1 are broken, and the divided nut may bear with strong tightening forces.

What is claimed is:

1. A divided nut comprising:
    first and second half nut parts of plastic divided along a direction of an axis of a screw hole of the divided nut to form first and second opposing faces and connected to each other with said first and second faces facing each other,
    spaced similar fitting projection means projected from said first face of said first half nut part,
    each of said spaced similar fitting projection means provided with linear slot and engaging pawls means, each of said engaging pawls means provided with a connecting tip,
    two pairs of spaced groove means formed in said second half nut part to receive said spaced similar fitting projection means projecting from said first face of said first half nut part, and
    engaging step means formed in said two pairs of spaced groove means which are engaged by the connecting tips provided on said engaging pawl means of each of said spaced similar fitting projection means when said first and second half nut parts are forced together.

2. The divided nut as claimed in claim 1 further comprising:
    belt-like connecting means for integrally connecting said first and second half nut parts together.

3. A divided nut as claimed in claim 2 wherein the fitting projection means project in parallel to each other from opposite sides of semicircular portions of the interposing screw hole of said divided nut and constructed to be bendable in inward and outward directions with a space between the engaging pawl means formed to be slightly wider than a width of the groove means formed in said second half nut part.

4. A divided nut comprising:

first and second nut parts of plastics divided along a direction of an axis of a screw hole of the divided nut to form first and second opposing faces and connected to each other with said first and second faces facing each other, bendable belt-like connecting means for integrally connecting an outer portion of said first and second half nut parts to each other, two pairs of parallel spaced holding projection means projecting from said second face on opposite sides of a semicircular portion of said second nut part, said parallel spaced holding projection means being elastically deformable, two pairs of parallel engaging projecting means formed with a center slot beginning at their outer ends, said two pairs of parallel engaging projection means projecting from said first face of said divided nut part including engaging pawl means provided with an engaging tip for engaging the holding projection means in a facing relationship, and having a thickness greater than a spacing between the engaging pawls of each of said pair of parallel spaced holding projections, and engaging step means provided on opposite sides of each of the engaging projection means to be engaged by said engaging pawl means of said holding projections in a state of a fixed fitting.

5. The divided nut as claimed in claim 4 wherein the belt-like connecting means include a bending portion at a position shifted adjacent the second face of the second divided nut part which provides the holding projection means, so as to fit the engaging projection means of said first divided nut part in the holding projections of said second divided nut part.

6. The divided nut as claimed in claim 4 wherein the engaging pawl means which engage the holding projection means of the second divided nut part provide inclined engaging sides which incline rearwardly from the base of the engaging pawl means to a tip thereof.

* * * * *